G. BAEHR.
COMPOSITE ROLL.
APPLICATION FILED SEPT. 25, 1916.
1,289,602. Patented Dec. 31, 1918.
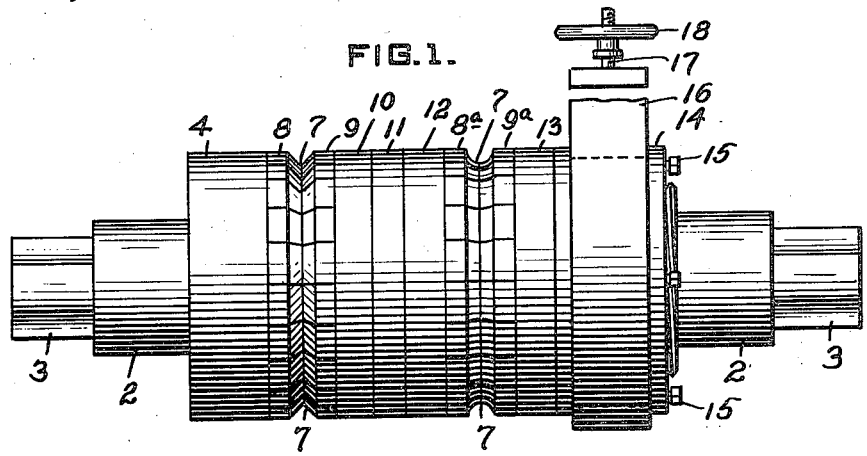
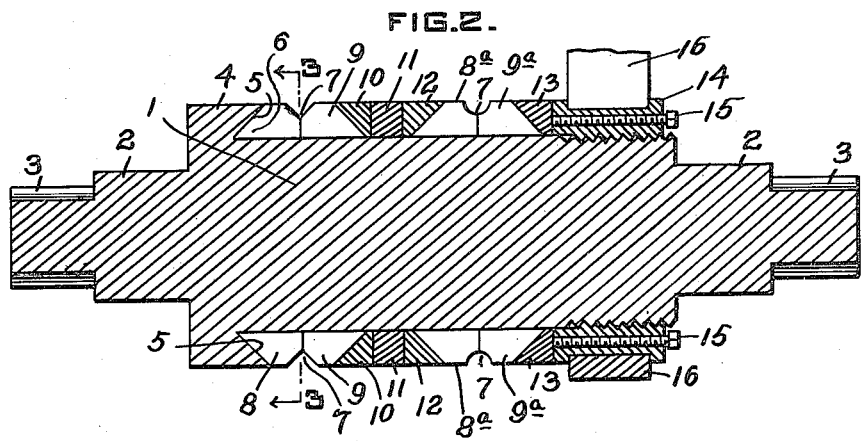
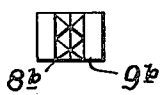
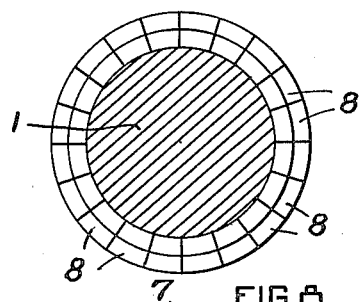
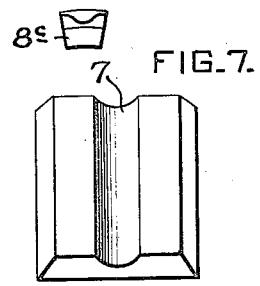
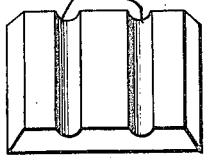
WITNESSES
J. Herbert Bradley.
Jo. Baily Brown
INVENTOR
George Baehr,
By Fredk W. Winter
Attorney.

UNITED STATES PATENT OFFICE.

GEORGE BAEHR, OF PITTSBURGH, PENNSYLVANIA.

COMPOSITE ROLL.

1,289,602.

Specification of Letters Patent.  Patented Dec. 31, 1918.

Application filed September 25, 1916. Serial No. 122,081.

*To all whom it may concern:*

Be it known that I, GEORGE BAEHR, a resident of Pittsburgh, in the county of Allegheny and State of Pennsylvania, have invented a new and useful Improvement in Composite Rolls, of which the following is a specification.

This invention relates to composite rolls for shaping steel and iron material. The object of the invention is to provide a roll having a permanent body member, and interchangeable facing members for contact with the metal being worked. Further objects are to provide means for holding the facing members rigidly in position on the roll, to prevent their working loose because of the expansion of parts under heat, and to provide simple and efficient means for placing the interchangeable parts in position, securing them there, and removing them when desired.

These and other objects are attained by a construction of parts, an embodiment of which is shown in the accompanying drawings.

Referring to the drawings, Figure 1 is a plan view of one form of my roll, removed from the bearing; Fig. 2 is an axial vertical section; Fig. 3 is a vertical section on the line 3—3 of Fig. 2; and Figs. 4, 5, 6, 7, and 8 show modified forms of facing members.

It is difficult in making rolls for steel mills to secure the proper hardness of surface, with the requisite toughness throughout. Further, there is difficulty in forming the grooves in the surface of large rolls, and especially is this true where deformed bars, as used for reinforcing concrete, are to be rolled, and other irregular shapes. Also, it is necessary to machine the surface of cast rolls, and this necessitates the handling of a heavy roll in the lathe. When the surface of solid rolls becomes worn, they must be reground, or machined, and this produces a smaller roll.

The present invention overcomes many of these difficulties. The mold body 1 may be a single steel casting, having the usual necks 2 and wabblers 3 at each end thereof for engagement with a proper driving mechanism. At one end of the roll body a fixed collar 4 is provided having an undercut portion 5 forming an annular inclined recess 6. At the other end the roll body is threaded for some distance. The grooves 7 for shaping the metal being worked are preferably formed by a pair of facing members 8 and 9 which are placed side by side against the roll body, and are of circular form adapted to fit on the body member, or spindle, 1, having abutting faces on their adjoining sides, and their other sides being inclined. These circular members are each preferably divided into a plurality of sections, which are slightly spaced apart at their ends so that when the facing members are engaged by the overhanging collars below described the tendency is to wedge said members against contact of the ends of adjoining sections. A slidable collar member, or ring, 10, having an undercut face adapted to coöperate with the inclined side of facing member 9, is longitudinally movable on the mold body. While it is for most purposes better to use parallel pairs of facing members, cut away at their joint to form a groove, it is obvious that the groove may be formed in the middle of the facing member, and only single members laid end to end used to make the shaping groove on the roll surface, and that more than one groove may be so formed in the surface of a single member. (See Figs. 7 and 8 of the drawings.)

A ring 11, with vertical faces is adapted to slide onto the mold body and to abut against the outer straight face of the retaining ring 10. This ring 11 is made of some metal having a co-efficient of expansion which is high in comparison with the ferrous metals used in the other parts, as for example, bronze. Removable undercut rings 12 and 13, having their undercut sides opposed, and their other sides vertical, are provided to retain a second series of facing members $8^a$ and $9^a$, in a manner similar to that used for retaining the members 8 and 9. A threaded nut member 14 is adapted to screw on the main body of the roll, and to drive all of the movable parts above noted toward the fixed collar 4.

Although, as shown, the roll comprises a series of two sets of facing members, *i. e.*, two grooves, it will be obvious that the roll may have only one groove, or more than two, if desired. My construction allows the roll to be built up to suit the particular use desired, with a wide variety of forms.

In assembling, the sections of the facing member 8 are placed in position, and forced under the overhanging portion 5, the sections of member 9 are then placed in the position shown, and the overhanging ring 10 is slipped over the inclined face of member 9. The expansion ring 11 is next moved to the position shown, also the overhanging ring 12, the sectional facing members 8ª are placed in position thereunder, also the sections of member 9ª are set in position and retained by slipping on the overhanging ring 13. After this the nut 14 is turned on until it makes close engagement with the ring 13. Further travel of the nut clamps all of the parts between itself and the overhanging fixed shoulder 5, and the undercut rings 10, 12 and 13 tend to ride upon the inclined facing members, and to clamp them inward against the roll body. Slight spaces are left between sections, so that this clamping action will not be as against a ring, but will have the effect of clamping each section individually in position between the undercut ring and the roll body. Set screws 15 may be provided longitudinally through the nut for the purpose of securing it in position and preventing its working loose when the roll is in operation. In order that the nut 14 may be driven tightly into position, and tightened at any desired time, a brake band 16 is provided extending partially around a circular collar on the nut, and having the terminal screw member 17 and hand wheel 18 for the purpose of drawing the brake, as will be obvious. This permits the tightening of the roll parts without stopping the operation, since the roll is rotating clockwise, and by retarding, by means of brake band 16, the threaded clamping member 14, that member tends to screw onto the threaded portion of the roll, and hence to move inward from the end thereof, to drive all of the clamping parts into more rigid relative relation.

Although, as above stated, it will be plain that the members 8 and 9 might be combined, and the groove formed in the center of sections of the facing members, it is preferable to build up that facing of two members in parallel sections, having the grooves formed at their joint. This, because, by so forming the parts, the groove may be readily formed by machining off the edges of the sections, and much more economically and easily than by channeling out a groove through the middle of a single member.

It will be best in certain cases to make the sections of facing members shorter than those shown in Fig. 3. This is particularly true when it is desired to adapt them for rolling deformed bars, and to cast the facing members with a supplementary groove in the grooved face, so as to form a raised figure running along each side of the bars. For instance, where a serpentine form is being rolled, or a W-form, the facing members may be cast of such length that each of them contains one unit of the shape. This is illustrated in Figs. 4, 5 and 6.

The construction shown permits the rigid joining of all the parts, since the undercut rings can be put under very heavy longitudinal pressure, which tends to force them upon the inclined sides of the facing members. In addition to this, the expansion ring 11, when the roll is heated by use, expands more than the other members, and so tends to take up any looseness that might otherwise develop. Also, when the roll is allowed to cool, this ring shrinks, and the parts, and nut, are loosened so that they may be easily removed.

This method of building up a roll allows the use of a main body member of any desired material, such as cast steel, and the use of facing members of more expensive and less ductile steel or iron, such as tool steel, chrome-steel, or other hard alloys. It permits the machining of parts of comparatively small weight, which may be more readily manipulated during the finishing and shaping process. Furthermore, the use of composite rolls of this form permits the use of a standard body member, with a great variety of facing members, thus doing away with the necessity and expense of having a great number of rolls on hand, the only difference in which is in the particular groove cut therein. With the present invention the same roll body can be left in position, and simply the facing members changed to conform to a variety of shapes.

When rolls become worn, it is necessary to re-face them. Ordinarily this can only be done by reducing the surface, causing a larger groove. But with my invention, by machining off the abutting edges of my facing members having a groove between, the two move together, the depth of the groove is reduced, and it may be resurfaced, without making an ultimately deeper groove. The lost material is taken up by further travel of the nut 14.

It will be apparent that the use of the built-up facing members, having the groove at the joints of parallel members will be particularly valuable where deformed bars, such as those used in concrete construction, are to be rolled, since the various cuts necessary can be very easily made in the edges of the two members forming the groove.

Other objects and advantages of the invention will be apparent to those familiar with the art.

I claim:—

1. A composite roll comprising a spindle, and undercut collars slidable thereon, sectional facing members arranged in parallel pairs forming a groove between the pairs, and means to move the collars longitudinally on the spindle to engage inclined edges of the facing members.

2. A composite roll comprising a spindle having a fixed undercut collar at one end, sectional facing members in pairs with a groove between retained against the body member by said collar and by a slidable undercut ring adapted to engage the facing members, and a screw member threaded on the spindle and adapted to drive the collars together to lock the facing members against the spindle.

3. A composite roll composed of a spindle and facing members thereon having inclined edges engaged by undercut rings, detachable means for moving the rings together on the spindle, and a ring on the spindle made of a metal having a comparatively high co-efficient of expansion.

4. In a composite roll, the combination of a spindle, facing members therefor, means to clamp said facing members against the spindle, and an expansion member adapted to tighten the clamping means when the roll is heated.

5. A composite roll comprising a spindle, facing members therefor, undercut rings slidable on the spindle and adapted to engage inclined edges of the facing members, a ring of metal of comparatively high co-efficient of expansion, a fixed collar at one end of the spindle, and a member threaded on the other end of the spindle adapted to clamp the facing and ring members against the fixed collar.

6. A composite roll comprising a spindle, an undercut abutment at one end, sectional facing members, undercut rings to clamp the facing members against the spindle, a threaded member at the other end of the spindle, and a brake on said threaded member, whereby to tighten it against the facing parts without stopping the roll.

In testimony whereof, I have hereunto set my hand.

GEORGE BAEHR.

Witnesses:
 GLENN H. LERESCHE,
 A. E. JOHNSON.